United States Patent [19]

Motsinger et al.

[11] Patent Number: 4,465,500

[45] Date of Patent: Aug. 14, 1984

[54] METHOD FOR SIZING GLASS FIBERS

[75] Inventors: Donald L. Motsinger, Forest City; Daniel G. Brown, Caroleen, both of N.C.

[73] Assignee: PPG Industries, Inc., Pittsburgh, Pa.

[21] Appl. No.: 422,042

[22] Filed: Sep. 23, 1982

Related U.S. Application Data

[62] Division of Ser. No. 268,542, May 29, 1981.

[51] Int. Cl.$^3$ .............................................. C03C 25/02
[52] U.S. Cl. ...................................... 65/3.43; 65/3.44; 106/213; 428/288; 523/214; 523/217
[58] Field of Search ..................... 65/3.1, 3.43, 3.44, 65/10.2; 428/378, 392, 288; 106/211, 213; 523/214, 217

[56] References Cited

U.S. PATENT DOCUMENTS

| | | | |
|---|---|---|---|
| 3,850,869 | 11/1974 | Mohr | 260/29.6 MN |
| 4,002,445 | 1/1977 | Graham | 65/3 C |
| 4,009,132 | 2/1977 | Furukawa et al. | 260/29.2 UA |
| 4,067,835 | 1/1978 | Takamori et al. | 260/22 R |
| 4,169,062 | 9/1979 | Weipert | 252/8.9 |
| 4,170,673 | 10/1979 | Conti | 427/401 |
| 4,265,704 | 5/1981 | Nahta | 162/156 |
| 4,361,465 | 11/1982 | Graham | 162/156 |
| 4,370,169 | 1/1983 | Graham | 162/156 X |

FOREIGN PATENT DOCUMENTS 5337957 10/1975 Japan .................................... 65/3.44

Primary Examiner—Robert L. Lindsay, Jr.
Attorney, Agent, or Firm—Kenneth J. Stachel

[57] ABSTRACT

An aqueous sizing composition with a cationic lubricant, amide compound, and water soluble or dispersible polyol which is used to produce wet chopped sized glass fiber strands. The sized wet or dried chopped glass fiber strands can be used to produce non-woven glass fiber strand mat, having good tensile strength, and good flexibility and reduced tendency for static generation. The wet chopped glass fiber strands also have good flowability in bulk handling apparatus.

12 Claims, No Drawings

METHOD FOR SIZING GLASS FIBERS

This is a division of application Ser. No. 268,542, filed May 29, 1981.

The present invention is directed to an aqueous sizing composition for treating glass fibers and the treated glass fibers where the treated glass fibers are to be used in producing glass fiber mat.

More particularly, the present invention is directed to an aqueous sizing composition for treating glass fibers and the treated glass fibers that are used for producing glass fiber strand mat having good tensile strength and flexibility.

The production of glass fibers from molten glass involves attenuating fibers from small orifices in a bushing in a glass melting furnace. As the glass fibers are attenuated, but usually before they are gathered into one or more strands, an aqueous sizing composition is applied to them. The aqueous sizing composition is necessary to provide protection to the fibers from interfilament abrasion. Also, the sizing composition can be used to promote compatibility between the glass fibers and any matrix in which the glass fibers are to be used for reinforcement purposes. In the production of glass fibers, after the sizing is applied, the fibers can be gathered into one or more strands and wound into a package or chopped while wet and collected. The collected continuous strands or chopped strands can then be dried or the wet chopped strands can be packaged in their wet condition. Such steps depend upon the ultimate use of the glass fibers. The dried continuous glass fibers can be subsequently chopped or combined with other glass fiber strands to form a roving or produced into continuous strand mats or woven.

Increasingly, glass fibers are being used to produce a non-woven type of mat where chopped fibers or chopped fiber strand are dispersed in an aqueous solution and formed into a paper-like mat product. An example of such a process is the "wet-laid process". Such a process invloves forming an aqueous solution of chopped glass fibers or chopped glass fiber strands usually under agitation in a mixing tank, feeding the suspension through a moving screen to form the mat of glass fibers, while the water is separated from the fibers. Glass fibers by their nature are difficult to disperse in water to form a uniform dispersion. This difficulty is encountered initially when the glass fibers are added to the water and complicated by the tendency of the glass fibers once scattered in the aqueous solution to reagglomerate to some degree. These reagglomerated fibers are then very difficult to redisperse.

Over the years, the art has dealt with this problem of the difficulty in dispersing glass fibers in an aqueous solution by several approaches. These approaches attempt to overcome the dispersion problem of glass fibers by controlling one or more of the factors believed to cause the problem. These factors include the length of the fibers, the electrical charges of the fibers, the diameter of the fibers, differing water absorption characteristics of the fibers, and the presence of sizing compositions or finishes on the glass fibers. One earlier method was to maintain an acid pH in the aqueous solution to which the glass fibers were added, but such a system required more expensive processing equipment due to the acidic nature of the aqueous solution. More recent approaches involve using a particular sizing composition in conjunction with a particular dispersing system that is added to the aqueous solution to which the sized glass fibers are added. Another approach is to refine the dispersing system that is to be added to the aqueous solution to which the glass fibers are added independent of whether the glass fibers are sized or unsized.

The various approaches used in the art provide a nonwoven glass fiber mat that has limited agglomeration areas of the glass fibers, thereby yielding a mat with good tear properties and tensile properties. It is also recently been suggested to have a post-treatment of the non-woven glass fiber strand mat to improve the wet tear properties of the mat while it is being processed into a non-woven glass fiber mat. The non-woven mat that is produced can be produced into paper with the use of proper binders, used as a mat for roofing materials, like shingles and built-up roofing, and for backing for flooring material or anywhere else where good tensile strength mat is required. Some of these uses require additional characteristics of a nonoven glass fiber strand mat to those achieved with the non-woven mats currently available. One such characteristics is improved tensile strength of the nonwoven glass fiber strand mat. A non-woven glass fiber strand mat may be stored in various forms such as in a roll for further use in paper making and the like. During the rolling and unrolling process, the mat must have sufficient strength to withstand various forces without cracking. Also, it would be advantageous to reduce the static between the layers of the non-woven mat on the rolls to allow increased quantities of the mat to be placed on the roll and to reduce the possibility of any static discharge from the rolls.

In addition, it would be advantageous to have a chopped glass fiber strand product that can be used in producing an aqueous solution for manufacture of a non-woven mat by a wet-laid process, where the sizing composition on the chopped glass fiber strands does not inhibit dispersibility of the strands in water. It would even be more advantageous to have chopped sized glass fiber strands that are water dispersible without the use of dispersing aids, since some of these dispersing aids can be expensive.

It is an object of the present invention to provide an aqueous sizing composition for glass fibers that are manufactured by the wet chopped forming process to yield wet chopped glass fiber strands having good flowability especially in bulk handling machinery.

It is a further object of the present invention to provide wet chopped glass fiber strands that have sufficient flowability in bulk handling machinery.

It is another further object of the present invention to provide an aqueous sizing composition for treating glass fibers in continuous or in wet chopped forming process that performs as a sizing composition and allows for the production of non-woven glass fiber strand mat having good tensile strength, and/or flexibility and/or reduced static.

It is a further additional object of the present invention to provide an aqueous sizing composition for treating glass fibers in the wet chopped forming process that produces chopped glass fiber strands having good dispersibility in aqueous solutions for forming non-woven glass fiber strand mat in a wet-laid process with or without the use of dispersing aids.

It is another additional object of the present invention to provide wet chopped sized glass fiber strands useful in producing non-woven glass fiber strand mat that has good tensile strength and/or flexibility and/or reduced static.

SUMMARY OF THE INVENTION

The aforementioned objects and other objects deducible from the following disclosure are provided by the aqueous sizing composition for treating glass fibers and the sized glass fiber strands of the present invention.

The aqueous sizing composition of the present invention has a major amount of the solids of the size comprised by one or more water soluble or dispersible polyols that are di or polyfunctional hydroxy or polymeric compounds stable at temperatures up to about 120° C. and in minor amounts of the solids, one or more cationic lubricants and in minor amounts of the solids, a water soluble or water dispersible amide. The aqueous sizing composition has an amount of water to give a total solids for the size in the range of about 0.1 to about 5 weight percent.

The method of producing flowable wet chopped glass fiber strands that are chopped during forming involves attenuating glass fibers from molten cones of glass from a bushing, sizing the glass fibers with an aqueous sizing composition having a major amount of polyol and minor amounts of a cationic lubricant and amide compound to control the moisture content of the chopped glass fiber strands within the range of at least about 9 to about 20 weight percent, gathering the fibers into one or more strands and chopping the glass fiber strands to produce wet chopped glass fiber strands.

The aqueous sizing composition is applied to glass fibers in any suitable glass fiber forming process including the wet chop and continuous strand forming process. When the continuous strand forming process is used, the aqueous sizing composition must also have a starch or polyvinylacetate film former used in conventional amounts. Such amounts would increase the overall solids of the size. The sized wet chopped glass fiber strands or dry chopped continuous strands can be used to produce a non-woven glass fiber strand mat by any process similar to the "wet-laid" process on any type of suitable machinery to produce a non-woven glass fiber strand mat with good tensile strength and with good flexibility and with reduced tendency to accumulate static charges.

DETAILED DESCRIPTION OF THE INVENTION

It is believed but, the present invention is not limited by this belief, that the good properties of flowability of the wet choped glass fiber strands and the flexibility of a non-woven mat made from the wet chopped glass strands are achieved because of the interactions of the chemical compounds comprising the non-aqueous materials of the sizing composition with the glass fibers. In addition, it is believed without limiting the invention that the interactions of the chemical compounds in the aqueous size and the glass produce wet chopped glass fiber strands which are capable of producing a non-woven glass fiber strand mat having good tensile strength and having a reduced tendency to accumulate a static charge.

In accordance with the present invention, the flowability of the wet chopped glass fiber strand is achieved only when the chopped glass fibers have been produced by a wet chop glass fiber forming process. The production of a flexible mat of glass fiber strand is achieved by wet or dry chopped glass fiber strand produced by the present invention.

The aqueous sizing composition of the present invention has a major amount of its solids comprised of one or more water dispersible or water soluble polyols. Polyols suitable for use are the di or polyfunctional hydroxy compounds or polymeric compounds all of which are stable at temperatures up to about 120° C. Nonexclusive examples of these compounds include alkylene glycols having up to six carbon atoms such as ethylene glycol, propylene glycol, 1,2-butane diol, 1,3-butane diol; 1,4-butane diol or tetramethylene glycol, 2,3-butane diol, 1,4-hexane diol, pentamethylene glycol, hexamethylene glycol and the like; neopentyl glycol, hexylene glycol, pentaerythritol, dispentaerythritol, trimethyol propane, sorbitol, glycerine, and polyalkylene glycols having the formulae:

$$HO(CH_2CH_2O)_nH$$

$$HO(CH_2CH_2CH_2O)_nH$$

where $n$ is a positive integer of at least 2 and usually commercially from 2 to about 25. Representative examples of this last class include di(ethylene) glycol, dipropylene glycol, tri(ethyleneoxy) glycol, dodecyl (ethyleneoxy) glycol; eicosyl (ethyleneoxy) glycol, tri(propyleneoxy) glycol, dodecyl (propyleneoxy)glycol and the like.

The amount of the polyol used in the aqueous sizing composition is in the range of about 0.5 to about 3.0 weight percent of the aqueous sizing composition. On a solids basis, the amount is a major amount preferably from about 70 weight percent to about 95 weight percent.

In the aqueous sizing composition a minor amount of the solids (nonaqueous components) is comprised of a cationic lubricant. Any suitable cationic lubricant can be used and these are typically amine salts of a fatty acid having 4 to 26 carbon atoms and in most cases, an even number of carbon atoms per molecule. Particularly suitable fatty acid moiety of the salt has between about 12 and 22 carbon atoms. The amines useful in forming the salt are tertiary amines of substantially low molecular weight, i.e., the alkyl groups attached to the nitrogen atom should have been 1 and 6 carbon atoms. Any suitable cationic lubricant can be used that imparts compatibility for the glass fibers and imparts slip to the exterior of the glass fibers. A particularly suitable cationic lubricant is the material available under the trade designation "Cation-X" which is an alkyl imidaizoline reaction product of a tetraethylene pentamine and stearic acid. Acid solubilized water dispersible stearic amides and anhydrous acid solubilized water dispersible low molecular weight fatty acid amides as well as anhydrous acid solubilized polyunsaturated low molecular weight fatty acid amides can also be used. Further examples of cationic lubricants include alkyl imidaizoline derivatives such as described in U.S. Pat. Nos. 2,200,815; 2,267,965; 2,268,273; and 2,355,837 which are incorporated herein by reference and made a part hereof. The cationic lubricant is used in an amount from about 0.05 to about 0.5 percent by weight based on the aqueous sizing composition. The amount of the cationic lubricant is a minor amount of the solids or ingredients other than water of the sizing composition. This minor amount is that amount which is effective for water compatibility of the glass fibers. Of the non-aqueous or solids constituents in the sizing formulation, the cationic lubricant is a minor amount preferably in the range of about 4 to about 20 weight percent.

The aqueous sizing composition also has present an amount of one or more amides, having at least one hydrogen associated with the nitrogen atom and having substantial water solubility or dispersibility. The amide may also have one or more amine groups, where the amine group is a primary or secondary amine. Any suitable amide, can be used that is substantially water soluble or water dispersible and that exists in the liquid or gas dissolved in liquid or solid state and that provides moisture control for the sized glass fiber strands.

Non-exclusive examples of these amides include monoamides, diamides, amine-containing amides, carbamide and derivatives where the amide and amine groups are primary or secondary or mixtures thereof. Further examples include: urea, (carbamide) methyl urea, 1,3-diethyl urea, 1,3-diaminourea, (carbohydrozide), methylurea, acetyleneurea, acetylenediurea, melamine, acetamide propionic amide and the like to up to caproamide and, diamides of saturated dicarboxylic acids such as oxamide, amlonamide, propanediamide, succinamide, adipamide, heptanediamide, octanediamide, nonanediamide and sebacamide, and semicarbazide, carbohydrazide, carbamidourea, allophanamide (biuret) and 1-carbamoylsemicarbazide (biurea). Particularly suitable saturated amides are the solid diamides such as urea, melamine, diamide of saturated dicarboxylic acids and the like that are slightly hygroscopic and capable of forming an aqueous salt solution.

The amount of the amide compound used in the aqueous sizing composition is that which is effective for moisture control of the wet chopped glass fiber strand. The amount of the amide compound used in the aqueous sizing composition is equivalent to about 0.1 to about 2 weight percent of the aqueous size, when the amide has an activity equivalent to urea. Higher amounts can be used, but such use would have diminishing returns. More active amides can be used in smaller amounts and less active amides can be used in larger amounts. On a solids basis, the amount of the amide compound is in the range from about 3 to about 40 weight percent of the solids or the non-aqueous components of the size for equivalent activity to urea.

In addition to the foregoing components of the aqueous sizing composition, additional ingredients may be used. One such additional ingredient is a silane coupling agent which can be one or more of any suitable silane coupling agents known to those skilled in the art for use in sizing compositions.

To use the aqueous sizing composition in a continuous glass fiber strand forming process, the size must also have a starch or polyvinylacetate film former. The amount of the starch film former is that typically used in aqueous sizing compositions for glass fibers. Once the continuous glass fiber strands are collected, they can be chopped or dried and chopped. The latter step produces a dry chopped glass fiber strand product. Generally, the solids content of the aqueous size is in the range of about 0.1 to 5 and preferably 0.1 to about 3 weight percent with a wet chop forming process. The solids content is concomitantly higher when the starch is used for continuous strand forming process or when additional ingredients are present. Any other ingredient commonly used in aqueous sizing compositions can also be used in the aqueous sizing composition of the present invention.

The aqueous sizing composition having at least the polyol, amide and cationic lubricant is preferably applied to the glass fibers in a wet chopped forming process. Such a forming process involves supplying a plurality of streams of molten glass, attenuating the streams into filaments, applying an aqeuous sizing composition to control the moisture of the resulting chopped glass fiber strands to a moisture level in the range of at least about 9 to about 20 weight percent of the chopped glass fiber strand, and cutting the continuous filaments into discrete segments. The glass fibers can be cut as individual fibers or they can be gathered into one or more strands and subsequently cut. The cut glass fibers or glass fiber strands are then collected as wet chopped glass fiber strands. Any other suitable wet chopped glass fiber forming process can be used when the aqueous sizing composition of the present invention is applied to the glass fibers. The control of the moisture content between the range of at least 9 and 20 and preferably 10-15 weight percent is crucial for the flowability of the wet chopped glass fiber strands. It is believed without limiting the invention that it is the moisture content and the uniformity of the moisture content that enables the wet chopped glass fiber strands to have good flowability properties.

The amount of the aqueous sizing on the wet chopped glass fiber strands varies from about 0.1 to about 0.5 percent LOI. The present LOI will be higher when a starch film former is present. The wet chopped glass fiber strands can be chopped into any lengths and the diameters of the glass fibers can be any diameter from the microsized glass fibers to the coarser diameter glass fibers even including coarse glass fiber strands having a diameter of around 27 microns. On average, a better result is obtained with the aqueous sizing composition of the present invention on the coarser glass fiber strands ranging in diameter from about 3 to about 27 microns.

The wet chopped glass fiber strands can be used in producing non-woven glass fiber strand mat. There is no absolute fiber length for a given glass fiber diameter in the production of non-woven glass fiber strand mat but generally the chopped strands having a length of about ¼ inch to 4 inches can be used. As the lengths increase, the fiber diameters can also increase and mixtures of various lengths and various diameter glass fiber strands can be used. The wet chopped glass fiber strands in any suitable length and diameter can be used for producing non-woven glass fiber strand mat. This invention can be carried out by employing any glass fibers conventionally employed to form glass mats. Preferably, the glass fibers will have a diameter within the range of about 3 to 27 microns and will have a length of about ¼ inch to 3 inches.

The wet chopped glass fiber strands can be formed into a non-woven glass fiber strand mat by any suitable process known to those skilled in the art. One example is the wet-laid process which involves, first, forming an aqueous suspension of short-length glass fibers under agitation in a mixing tank and, second, feeding the suspension through a moving screen on which the fibers enmesh themselves while the water is separated therefrom. The amount of chopped glass fiber strands added to the water can be in the range of about 0.5 to about 1 weight percent of the aqueous solution. The wet chopped sized glass fibers of the present invention can be used in conjunction with conventional paper making apparatus such as the inclined wire, the rotoformer or the fourdrinier machines.

The wet or dry chopped glass fiber strands of the present invention can be used with or without dispersing aides to form a dispersion of glass fiber strands in an aqueous suspension for use in the wet-laid process or other paper making processes and machines. Although the sized glass fibers of the present invention can be used without dispersion aids, any of the conventional dispersing aides can be used along with the chopped sized glass fiber strands of the present invention. Examples of dispersing aids that can be used include the polyoxyethylated tallow amine dispersing agents available from GAF Corporation under the trade designation "Katapol" materials used alone or in conjunction with a thickener like hydroxyethyl or hydroxymethyl cellulose such as that available from Hercules, Inc., under the trade designation "Natrasol". Another example of a dispersing agent that can be used with the chopped glass fiber strands of the present invention is the dispersing agent available from Diamond-Shamrock Chemical Company under the trade designation "Nopcosperse" and especially the "Nopcosperse FFD" product. The Nopcosperse FFD product is a blend of alkyl sulfate quaternary of an alkyl amino fatty acid amine or amide in a water dispersible, liquid mineral oil with an inorganic silica defoaming agent. Another example of dispersing agents that can be used include quaternary ammonium compounds such as those available under the trade name "Arquad 2HT-75" and the like. Also quaternary ammonium surfactants can be used such as those available under the "Arquad" and "Aliquat" trade designations and mixtures of amine oxides with derivatized guar gum and mixtures of guar gum and isostearic amide can also be used.

Any suitable binder known to those skilled in the art may be used with the non-woven glass fiber strand mat to form a paper like mat. The typical binder used is a urea formaldehyde resin and chemically modified urea formaldehyde resins such as cationic, neutral or anionic urea formaldehyde resin.

PREFERRED EMBODIMENT

Although the aqueous sizing composition can have any particular type of the aforelisted components in any amount of the aforelisted ranges and mixed by any suitable process known to those skilled in the art, the aqueous sizing composition has a preferred formulation and a preferred process for mixing. The preferred formulation is as follows:

| Ingredients For 300 Gallons (1,135 liters) For Any Volume | | |
|---|---|---|
| Cold Water | 568 liters | |
| Diethylene glycol | 12,020 grams | 1.6 weight % of aqueous size |
| Hot Water (40° C.) | 37.85 liters | |
| Urea (100% solids) | 2994 grams | .26 |
| Hot Water | 37.85 liters | |
| Cationic lubricant Cation-X 33–39% solids | 2994 grams | .1 |

It is preferred when mixing the aforementioned materials that the water used is deionized water. The pH of the aqueous sizing composition is preferably 5.9±0.5.

The aqueous sizing composition is prepared by first adding the initial cold deionized water to the main mix tank. Second, the diethylene glycol is added to the main mix tank and agitated for around 5 minutes. The urea is then dissolved in 37.9 liters (10 gallons of hot water) per the 11,136 liter final volume in a suitable premix tank and agitated until dissolved and then added to the main mix tank with continued agitation. Next, the Cation-X lubricant is added to 37.9 liters/11,136 liter size volume of hot water in a suitable premix vessel and agitated until dissolved and added to the main mix vessel. The aqueous sizing composition is then diluted to the final desired volume with cold deionized water and agitated for around 15 minutes.

The aqueous sizing composition is applied to the glass fibers formed by the wet chopped glass fiber forming process. The residue of the size on the glass fibers is preferably in the range of 0.02 to about 0.15 loss on ignition (LOI) although slightly higher LOIs can be used. In this process, the glass fiber strands are chopped preferably to a length of around one-half to one inch and the filament diameter of the fiber is preferably around 10–20 microns.

The sized wet chopped glass fiber strands are preferably used in the manufacture of paper-like non-woven glass fiber strand mat. In manufacturing the non-woven glass fiber strand mat, it is preferred to use a dispersing system and the preferred dispersing system is a blend of polyoxethylated (5) tallow amine available from GAF Corporation under the trade designation Katapol blended with a hydroxymethyl cellulose available, Natrasol 250HR or in an alternative embodiment to use a blend of the Natrasol 250HR with Napcosperse FFD dispersion aid available from Diamond-Shamrock Corporation. These dispersion aids are used in suitable amounts known by thse skilled in the art. The wet chopped glass fiber strands are added to an aqueous solution along with the dispersion system with agitation to produce an aqueous solution of dispersed glass fiber strands. It is believed without limiting the invention that some quantity of the diethylene glycol on the strands is released in the water and forms a matrix for the glass fiber strands. The dispersed strands are manufactured further by the wet-laid process and combined with a binder to produce the non-woven glass fiber strand mat. It is preferred that such a binder is an anionic polymer binder known to those skilled in the art, and it is particularly suitable that the binder is an anionic urea formaldehyde resin.

The preferred embodiment and other embodiments are illustrated further by the following examples.

EXAMPLE I

An aqueous dispersion of the chopped glass fiber strands produced in accordance with the formulation and process of the preferred embodiment was prepared using two dispersion systems. The first dispersion system was the Katapol material blended with the Natrasol 250HR material used in conventional amounts. The second dispersion system was the Nopcosperse FFD blended with the Natrasol 250HR thickening material used in conventional amounts. The non-woven mat was produced by the wet-laid process with the use of a urea formaldehyde binder, preferably an anionic binder is used like acrylic modified urea formaldehyde. The tensile strength of the mat was tested against a non-woven glass fiber strand mat produced with a commercially available chopped glass fiber strand manufactured by Owens-Corning Fiber Glass Corporation. The results of this testing are given in Table I.

The urea formaldehyde resin used is that available from Pacific Resins and Chemical, Inc. under the trade designation "3958-E".

TABLE I

| Experiment No. | Glass Mat | Mat Wt. | Mat LOI % | Disp. Chem. | Disp. Rating | Tensile Strengths,[1] MD 3"[2] lb./in. | | | | | Tear[5] (grams) | Taber[6] (units) |
|---|---|---|---|---|---|---|---|---|---|---|---|---|
| | | | | | | Dry | Cold Wet | cw/d[3] | Hot Wet | hw/d[4] | | |
| 1 | Commercial | 1.81# | 19.7 | 250 HR KAT | Good | 95.5 | 88.5 | 0.93 | 35.7 | 0.37 | 335 | 44 |
| 2 | Commercial | 2.00# | 19.4 | 250 HR FFD | Fair⁻ | 85.5 | 73.7 | 0.86 | 20.5 | 0.24 | 465 | 66 |
| 3 | Ex. 1 | 2.13# | 18.2 | 250 HR KAT | Fair | 114.5 | 93.2 | 0.81 | 30.7 | 0.27 | 267 | 71 |
| 4 | Ex. 1 | 2.21# | 17. | 250 HR FFD | Good | 82.5 | 72.5 | 0.88 | 31.5 | 0.38 | 305 | 57 |
| 5 | Ex. 1 | 2.0# | 21.7 | 250 HR KAT | Good | 91.0 | 83.7 | 0.92 | 3.5 | 0.04 | 289 | 83 |
| 6 | Ex. 1 | 2.5# | 19.4 | 250 HR FFD | Fair+ | 100.5 | 75.3 | 0.75 | 3.0 | 0.03 | 453 | 49 |
| 7 | Ex. 1 | 2.15# | 18.9 | 250 HR KAT | Fair+ | 107.0 | 83.2 | 0.78 | 55.5 | 0.52 | 407 | 77 |
| 8 | Ex. 1 | 2.33# | 19.0 | 250 HR FFD | Fair | 109.5 | 98.0 | 0.89 | 47.5 | 0.43 | 319 | 97 |
| 9 | Ex. 1 | 2.10# | 16.6 | 250 HR KAT | Fair+ | 92.7 | 74.2 | 0.80 | 13.2 | 0.14 | 369 | 52 |
| 10 | Ex. 1 | 1.86# | 20.4 | 250 HR KAT | Good⁻ | 86.0 | 73.7 | 0.86 | 26.5 | 0.31 | 241 | 53 |
| 11 | Ex. 1 | 2.26# | 18.2 | 250 HR FFD | Fair+ | 89.7 | 79.7 | 0.89 | 19.7 | 0.22 | 381 | 48 |

[1]Tensile strength was measured on Instron Machine with 3" span moving at 0.5 in./min.
[2]MD-3" refers to tensile strength in the machine direction for a 3" × 3" square specimen.
[3]cw/d refers to cold wet retained.
[4]hw/d refers to hot wet retained.
[5]Tear strength measured by standard Elmendorf Tearing Test at (1600 grams).
[6]Taber test for flexibility at 15 bending angle with 100 units as the highest obtainable unit.
[7]MIT tests cycles to break in a standard MIT testing machine with 0.03 inch jaw with 0.5 Kg tension.

Table II presents data showing the performance of the wet chopped glass fiber strands produced in accordance with the preferred embodiment and Example I in different resin systems for producing non-woven glass fiber strand mat. The mat of Example I is compared to a mat produced with commercial chopped glass fiber strands from Owens-Corning Fiber Glass Corp. Table II gives the estimated tensile strengths of the two materials relative to each other.

TABLE II

Estimated Tensile Strengths for Papers At 2 Pounds Basis Weight and 20% Binder

| Binder | Glass Mat | Dispersion System | Tensile Strength lb./in. |
|---|---|---|---|
| 3958D | Commercial | Napcosperse FFD/Natrasol 250 HR | 29.04 |
| | Ex. 1 | Napcosperse FFD/Natrasol 250 HR | 23.43 |
| 3958E | Commercial | Napcosperse FFD/Natrasol 250 HR | 22.62 |
| | Ex. 1 | Napcosperse FFD/Natrasol 250 HR | 26.08 |
| 3958F | Commercial | Napcosperse FFD/Natrasol 250 HR | 29.52 |
| | Ex. 1 | Napcosperse FFD/Natrasol 250 HR | 27.49 |
| 3958G | Commercial | Napcosperse FFD/Natrasol 250 HR | 24.59 |
| | Ex. 1 | Napcosperse FFD/Natrasol 250 HR | 25.63 |
| 3958D | Commercial | Katapol/Natrasol 250 HR | 26.83 |
| | Ex. 1 | Katapol/Natrasol 250 HR | 28.75 |
| 3958E | Commercial | Katapol/Natrasol 250 HR | 25.34 |
| | Ex. 1 | Katapol/Natrasol 250 HR | 28.40 |
| 3958D | Commercial | Katapol/Natrasol 250 HR | 26.38 |
| | Ex. 1 | Katapol/Natrasol 250 HR | 28.75 |
| 3958F | Commercial | Katapol/Natrasol 250 HR | 29.79 |
| | Ex. 1 | Katapol/Natrasol 250 HR | 38.56 |
| 3958G | Commercial | Katapol/Natrasol 250 HR | 23.86 |
| | Ex. 1 | Katapol/Natrasol 250 HR | 26.25 |

D - is a neutral urea formaldehyde resin.
E - is a cationic urea formaldehyde resin (chemically modified to be cationic).
F - is an anionic urea formaldehyde resin (chemically modified to be anionic).
G - is a neutral urea formaldehyde resin.

We claim:
1. Method of producing flowable wet chopped glass fiber strands comprising:
   attenuating glass fibers from molten cones of glass from a bushing,
   applying an aqueous sizing composition to the glass fibers, where the composition has one or more cationic lubricants,
   one or more water soluble or dispersible nonpolymeric amide compounds selected from the group consisting of urea (carbamide), methyl urea; 1,3-diethyl urea; 1,3-diaminourea (carbohydrazide); methylurea; acetyleneurea; acetylenediurea; melamine; acetamide; propionic amide up to caproamide; and diamides of saturated dicarboxylic acids and sebacamide, and semicarbazide, carbohydrazide, cabamidourea, allophanamide (biuret) and 1-carbomoylsemicarbamide (biurea) in an effective amount to provide moisture control of the wet chopped glass fibers in the range of about 9 to about 20 weight percent of the chopped glass fibers, and one or more water soluble or dispersible polyols that comprises a predominant amount of the nonaqueous components of the sizing composition, and water in a major amount of the aqueous sizing composition, gathering the glass fibers into one or more strands, chopping the glass fiber strands to produce wet chopped glass fiber strands having a moisture content in the range of at least 9 to about 20 weight percent of the chopped strand.

2. Method of claim 1, wherein the polyol is diethylene glycol.

3. Method of claim 1, wherein the cationic lubricant is present in an amount in the range of about 0.05 to about 0.5 weight percent of the aqueous treating composition.

4. Method of claim 1, wherein the cationic lubricant is present in an amount in the range of about 4 to about 20 weight percent of the solids of the treating composition.

5. Method of claim 1, wherein the polyol is present in the aqueous treating composition in an amount in the range of about 0.5 to about 3 weight percent.

6. Method of claim 1, wherein the cationic lubricant is an alkyl imidazoline reaction product of tetraethylene pentamine and stearic acid.

7. Method of claim 1, wherein the water soluble or dispersible amide is urea.

8. Method of claim 1, wherein the polyol is selected from di or polyfunctional hydroxy compounds or polymeric compounds including alkylene glycols having up to 6 carbon atoms, neopentyl glycol, hexylene glycol, pentaerythritol, dispentaerythritol, trimethyol propane, sorbitol, glycerine, and polyalkylene glycols having the formula $HO(CH_2CH_2O)_nH$ or $HO(CH_2CH_2CH_2O)_nH$, where $n$ is a positive integer of at least 2 to about 25.

9. Method of claim 1, wherein the amide compound is present in an amount in the range of about 3 to about 40 weight percent of the solids of the treating composition.

10. Method of claim 1, wherein the aqueous treating composition has a silane coupling agent.

11. Method of claim 1, wherein the aqueous treating composition has a film forming polymer selected from starch or polyvinyl acetate.

12. Method of claim 1, wherein the amide compound is present in an effective amount to control the moisture of the chopped strands in the range of about 10 to about 15 weight percent.

* * * * *